United States Patent [19]

Craig et al.

[11] Patent Number: 4,992,605
[45] Date of Patent: Feb. 12, 1991

[54] PRODUCTION OF HYDROCARBONS WITH A RELATIVELY HIGH CETANE RATING

[76] Inventors: Wayne K. Craig, 126 Auld Crescent, Saskatoon, Saskatchewan, Canada, S7H 4W9; Douglas W. Soveran, 7309 5th Avenue, Regina, Saskatchewan, Canada, S4T 0N2

[21] Appl. No.: 302,255

[22] Filed: Jan. 27, 1989

Related U.S. Application Data

[63] Continuation-in-part of Ser. No. 156,029, Feb. 16, 1988, abandoned.

[51] Int. Cl.$^5$ .............................................. C10L 1/04
[52] U.S. Cl. ..................... 585/240; 585/14; 260/409; 44/389
[58] Field of Search .................. 585/13, 14, 250, 240; 260/409; 44/66

[56] References Cited

U.S. PATENT DOCUMENTS

| 218,278 | 4/1925 | Mailhe | 585/240 |
|---|---|---|---|
| 2,163,563 | 6/1939 | Schrauth | 585/13 |
| 3,865,853 | 2/1975 | Hinz | 260/409 |
| 3,877,888 | 4/1975 | Gaydasch | 44/66 |
| 3,896,053 | 7/1975 | Broecker et al. | 260/409 |
| 4,307,248 | 12/1981 | Barnett et al. | 585/267 |
| 4,308,411 | 12/1981 | Frankiewicz | 585/240 |
| 4,532,351 | 7/1985 | Barnett et al. | 585/276 |
| 4,659,335 | 4/1987 | Wegner et al. | 44/72 |
| 4,711,713 | 12/1987 | Zarrineghbal et al. | 208/222 |
| 4,734,392 | 3/1988 | Ganguli et al. | 502/335 |

Primary Examiner—Anthony McFarlane
Attorney, Agent, or Firm—J. Szereszewski

[57] ABSTRACT

There is described a process for producing hydrocarbon products in the diesel boiling range, comprising mainly $C_{15}$–$C_{18}$ paraffins and being highly effective as diesel fuel ignition improvers. The process comprises hydroprocessing vegetable oils such as canola, sunflower, soybean and rapeseed oils or some fatty acids in hydroprocessing temperatures (350°–450° C.), pressures (4.8–15.2 MPa) and liquid hourly space velocity (LHSV) of 0.5–5.0 hr$^{-1}$ depending on the type and purity of the feedstock. Commercially available hydroprocessing catalysts may be used.

8 Claims, No Drawings

PRODUCTION OF HYDROCARBONS WITH A RELATIVELY HIGH CETANE RATING

CROSS-REFERENCE TO RELATED APPLICATION

This application is a Continuation-in-part of U.S. application Ser. No. 07/156,029, filed Feb. 16, 1988 now abandoned.

FIELD OF THE INVENTION

This invention relates to a process for producing hydrocarbons with a relatively high cetane number, effective as diesel fuels or diesel fuel ignition improvers, and to the hydrocarbons obtained by the process.

REVIEW OF THE PRIOR ART

As the demand for diesel fuels increases, the quality of diesel fuel obtained by refining heavier crude oils deteriorates, thus requiring the addition of ignition improvers to diesel fuel. Various additives, or diesel fuel extenders, have been proposed to date with a view to bringing the cetane number of diesel fuel to at least about 40. Improvement in the cetane rating of commercial diesel fuel can be accomplished by the addition of certain alkyl nitrates. Drawbacks associated with the use of these materials as additives include their relatively high cost and non-linear relationship between the improvement in cetane rating and the amount of additive in the resulting fuel blend. For example, U.S. Pat. No. 4,711,713 to Zarrineghal et al discloses a process for enhancement of a diesel fuel by treating a low-cetane diesel oil with a nitrogenous treating agent. Such treatment raises the cetane number of the diesel fuel by adding thereto certain nitrogen compounds, thereby changing its chemistry. The change of cetane number of a blend of the treated oil with untreated oil is not proportional to the amount of the nitrogenated (treated) oil, best results being obtained below 15% of the treated oil in the blend.

An ignition improver for internal combustion engines has been proposed by Wegner et al, U.S. Pat. No. 4,659,335, the improver consisting of nitrocellulose and a polyether with at least three ethylene oxide units.

It has been known for a number of years how to produce hydrocarbons from biological material. For instance, U.S. Pat. No. 4,652,686 issued to Coenen et al refers to the production of hydrocarbons from biological sludge. In the late 1970s, Mobil researchers showed that a variety of biomass substrates could be catalytically converted to liquid aromatic hydrocarbons and olefins using a shape selective ZSM-5 zeolite catalyst. One of the feedstocks tried was corn oil, an unsaturated triglyceride vegetable oil. The hydrocarbon end products from this oil represent clean premium fuels: LPG, high octane gasoline with a high aromatic content and a light distillate fraction.

Vegetable oils can be hydrogenated to yield saturated solid fats, e.g. margarine. The hydrogenation processes aim at saturating double bonds in the presence of certain catalysts, e.g. transition metals, at temperatures up to about 315° C. and high pressures. Exemplary catalysts suitable for such a process, conducted at temperatures from 75° C. to 300° C. and yielding a solid fatty substance are disclosed in U.S. Pat. No. 4,532,351 to Barnett et al.

Recent studies in Brazil (Alencar et al, J. Agricultural Food Chemistry, V31,N.6,pg.1268-70,1983) have shown that different fuels and industrial chemicals can be produced from vegetable oils, frequently in high yields, simply by changing the nature of the catalyst, temperature and reaction period. With no catalyst and a thermal cracking temperature of 350° C., the main products were terminal olefins and n-alkanes derived from free radical disproportionation and decarboxylation of the vegetable oil. With calcium oxide as a catalyst, the main products were long chain methyl ketones. Bentonite catalysts gave alkylbenzenes somewhat analogously to the shape selective zeolite catalysts.

Research recently conducted at the University of Saskatchewan has shown that canola oil can also be converted, with yields in excess of 98 wt. %, using the same catalyst as the above mentioned Mobil researchers, where 70–75% of the converted product is a high octane gasoline. The process used was Fluid Catalytic Cracking (FCC).

Unmodified vegetable oils have also been used in diesel engines, mainly as extenders. Limited success was achieved due to the different physical properties of the raw vegetable oils as compared to specification diesel fuels. Operational problems included injector coking, engine deposit buildup and lubricating oil contamination.

Conversion of vegetable oils to methyl esters has also been achieved. This process yields a product that is closer to a specification diesel fuel than a raw vegetable oil, but the economics of this product, the fact that it is still a non-specification fuel product and its cetane value—in the 45–50 range—do not make it suitable as an ignition improver.

It is an object of this invention to develop a process for producing liquid hydrocarbons in the diesel fuel boiling range which are effective as cetane number improvers, from vegetable oils.

DEFINITION OF THE INVENTION

According to the invention there is provided a process for producing hydrocarbons in the diesel fuel boiling range, effective as ignition improves, the process comprising (a) hydroprocessing a feedstock containing fatty acids or triglycerides of fatty acids or mixtures thereof by contacting the feedstock with gaseous hydrogen under hydroprocessing conditions in the presence of a hydroprocessing catalyst whereby a mixture of compounds including a diesel fuel boiling range fraction is obtained;

(b) separating the mixture of compounds; and (c) removing from the mixture the fraction containing products boiling in the diesel fuel boiling range.

As the feedstock, a number of vegetable oils may be used. A triglyceride oil with fatty acids chains having typically about 15–18 carbon atoms in the particle or their mixture, or similar free fatty acids, are suitable as a starting material for the production of a product with a high cetane rating.

The catalysts suitable for the purpose of the invention are commercial hydroprocessing catalysts including cobalt-molybdenum (Co-Mo) catalysts, nickel molybdenum (Ni-Mo) catalysts, or other transition metal based catalysts used for hydroprocessing [e.g. American Cynamid HDS-20 or Shell S-424].

The hydroprocessing conditions generally suitable to obtain the hydrocarbons of the invention include a temperature in the range from about 350°–380° C. (depending on the feedstock) to about 450° C. and a pressure from about 4.8 MPa to about 13.8–15.2 MPa and an LHSV of 0.5–5.0 hr$^{-1}$ also depending on the choice of feedstock.

DETAILED DESCRIPTION OF INVENTION

It is well known that vegetable oils such as canola oil constitute triglycerides with three fatty acid chains.

It has long been recognized that ignition properties of conventional diesel fuel may be improved by the use of certain additives. Since cetane ($C_{16}H_{34}$) and octadecane ($C_{18}H_{38}$) by definition have very good ignition properties (expressed by cetane rating), it is logical to attempt to increase the cetane rating of diesel fuel by adding thereto paraffinic hydrocarbons in the $C_{16}$–$C_{18}$ range provided that their other properties such as viscosity, pour point, cloud point, boiling point, etc., are congruent with those of diesel fuel.

A number of experiments have been conducted with canola oil, sunflower oil, palm oil, soybean oil, and rapeseed oil (high erucic acid content). A fatty acid fraction of crude tall oil was also tested.

It is important to note that canola oil is available as the premium, edible variety or as a so-called "green" canola or "sample" canola oil. It will be seen from the results to follow that these lower grades of canola oil require somewhat different processing conditions than the premium canola oil.

Hydroprocessing is a generic term encompassing a number of processes using hydrogen, e.g. hydrogenation, hydrocracking and hydrotreating.

As used in this invention, hydroprocessing includes the hydrocracking of the triglyceride structure, hydrotreating (removal of oxygen) and hydrogenation of unsaturated bonds. Surprisingly, hydroprocessing conditions, as defined herein below, work very efficiently to convert the triglceride feedstock to paraffinic hydrocarbon chains corresponding in length to the original "branches" in the basic triglyceride structure. The apparatus used in these experiments was a fully automated, bench scale hydroprocessing system. The unit included a fixed bed downflow 30 ml reactor with an associated high pressure gas/liquid separator, in which the liquid level was controlled. The gas product was scrubbed in a sodium hydroxide solution, then measured using a wet test meter.

Three operating variables—temperature, pressure and the liquid hourly space velocity (LHSV) were selected as the operating parameters to be studied. Three temperatures, 350°, 385° and 420° C were initially selected along with three pressure values 4.8, 9.3 and 13.8 MPa. The three LHSV values selected were 0.5, 1.0 and 1.5.

The selected parameters were adjusted in the course of experiments when problems occurred such as transfer lines plugging with solid material.

Table 1 illustrates the results of the actual series of experiments. It will be noted that light cycle oil (LCO), which is derived from the catalytic cracking of a conventional petroleum gas oil (345°–525° C. boiling range), was also hydroprocessed by itself and in blends with canola oil.

The gas products were separated and analyzed for short chain hydrocarbons and other gases, see below. The liquid products were distilled into three fractions, 0°–210° C., 210°–343° C. and 343° C.+, using a short path distillation (wiped film evaporator) apparatus. The 210°–343° C. fraction (the diesel fraction) was analysed for density, viscosity and copper strip corrosion. Gas chromatographic mass spectral analysis was used to ascertain the quantity 25 and identify of the components present in the 210°–343° C. fraction.

TABLE 1

| | | | | Yield Summary | | | | |
| Exp. # | Feed | Temp. (C.°) | Press. (MPa) | Water wt % | 0–210 wt % | 210–343 wt % | 343 + wt % | Gas wt % |
| --- | --- | --- | --- | --- | --- | --- | --- | --- |
| F86-09B | Canola | 385 | 9.3 | 7.9 | 1.7 | 85.4 | 1.5 | 5.8 |
| F86-09C | Canola | 420 | 12.9 | 9.9 | 4.1 | 80.3 | 4.3 | 6.0 |
| F86-09D1 | Canola | 420 | 3.4 | 3.3 | 10.1 | 53.4 | 21.2 | 6.2 |
| F86-09D2 | Canola | 420 | 3.4 | 5.2 | 8.7 | 65.5 | 8.9 | 8.7 |
| F86-10B | Canola | 350 | 4.8 | 8.1 | 2.2 | 81.9 | 3.3 | 8.1 |
| F86-10C | Canola | 350 | 2.0 | 4.3 | 2.0 | 67.3 | 19.2 | 9.4 |
| F86-10D | Canola | 320 | 4.8 | | | not determined | | |
| F86-10E | Canola | 420 | 4.8 | 6.9 | 3.9 | 76.0 | 3.9 | 7.6 |
| F86-10F | Canola | 385 | 4.8 | 7.2 | 9.2 | 62.3 | 12.9 | 8.1 |
| F86-10G | Canola | 350 | 4.8 | 3.3 | 3.1 | 51.7 | 35.7 | 5.0 |
| F87-11B | Canola | 350 | 4.8 | 7.3 | 0.6 | 81.2 | 5.8 | 6.4 |
| F87-11C | Canola | 350 | 4.8 | 12.1 | 1.2 | 83.0 | 2.6 | 5.4 |
| F87-11D | 50% LCO | 350 | 4.8 | 1.9 | 18.0 | 72.8 | 1.8 | 12.2 |
| F87-11E | LCO | 350 | 4.8 | 0 | 16.0 | 74.0 | 10.2 | 8.9 |
| F87-11F | Canola | 350 | 4.8 | 6.2 | | | | 10.6 |
| F87-11G | Canola | 350 | 4.8 | 5.6 | 1.2 | 63.1 | 30.1 | 12.6 |
| F87-12B | Rapeseed | 385 | 8.2 | 8.7 | 3.5 | 37.0 | 50.8 | 12.0 |
| F87-12C | Sunflower | 360 | 6.9 | 9.2 | 3.3 | 67.1 | 20.3 | 11.3 |

NOTE:
All yields are weight % of the liquid feed.
All experiments except F86-10D were 24 hours in duration.
The hydrogen to liquid feed was held constant at 900 cm$^3$ H$_2$/cm$^3$ of liquid feed.

TABLE 2

| | | | | Analysis of the 210–343 C Fraction | | | | |
| | | Temp. | Press. | Density kg/m$^3$ | | Viscosity (cSt) | | H$_2$ Cons. |
| Exp. # | Feed | (C.°) | (MPa) | (@ 25° C.) | Cor. | 20° C. | 40° C. | cm$^3$/cm$^3$ |
| --- | --- | --- | --- | --- | --- | --- | --- | --- |
| F86-09B | Canola | 385 | 9.3 | 0.7807 | 4B | 3.95 | 2.69 | .028 |
| F86-09C | Canola | 420 | 12.9 | 07827 | 0 | 3.8 | 2.61 | .016 |
| F86-09D1 | Canola | 420 | 3.4 | 0.8031 | 4A | 4.28 | 2.89 | .032 |

TABLE 2-continued

Analysis of the 210-343 C Fraction

| Exp. # | Feed | Temp. (C.°) | Press. (MPa) | Density kg/m³ (@ 25° C.) | Cor. | Viscosity (cSt) 20° C. | Viscosity (cSt) 40° C. | H₂ Cons. cm³/cm³ |
|---|---|---|---|---|---|---|---|---|
| F86-09D2 | Canola | 420 | 3.4 | 0.7936 | 4A | 3.95 | 2.67 | .021 |
| F86-10B | Canola | 350 | 4.8 | 0.7813 | 3B | 3.91 | 2.84 | .017 |
| F86-10C | Canola | 350 | 2.0 | 0.7860 | 2C | 3.94 | 2.82 | 0.15 |
| F86-10D | Canola | 320 | 4.8 | | not analyzed | | | |
| F86-10E | Canola | 420 | 4.8 | 0.7854 | 4A | 3.90 | 2.67 | .011 |
| F86-10F | Canola | 385 | 4.8 | 0.8041 | 4B | 4.06 | 2.75 | .015 |
| F86-10G | Canola | 350 | 4.8 | 0.8069 | 4A | 4.32 | 2.87 | .011 |
| F87-11B | Canola | 350 | 4.8 | 0.7818 | 4A | | | .017 |
| F87-11C | Canola | 350 | 4.8 | 0.7829 | 4A | | | .020 |
| F87-11D | 50% LCO | 350 | 4.8 | 0.8328 | 4B | 5.79 | 3.61 | .010 |
| F87-11E | LCO | 350 | 4.8 | 0.9158 | 4B | 4.38 | 2.77 | .005 |
| F87-11F | Canola | 350 | 4.8 | | not analyzed | | | .011 |
| F87-11G | Canola | 350 | 4.8 | | not analyzed | | | .010 |
| F87-12B | Rapeseed | 385 | 8.2 | | not alanyzed | | | .014 |
| F87-12C | Sunflower | 360 | 6.9 | | not analyzed | | | .013 |

TABLE 3

Yield Summaries

| Experiment | F87-14B | F87-14D | F87-14E | F87-14G |
|---|---|---|---|---|
| Feedstock | Soybean | "Sample" Canola | "Green" Canola | Fatty Acid Fraction |
| Catalyst | Co-Mo | Co-Mo | Co-Mo | Co-Mo |
| Temperature (°C.) | 350 | 375 | 375 | 380 |
| Pressure (MPa) | 5.5 | 5.5 | 5.5 | 5.5 |
| LHSV (actual, hr⁻¹) | 1.01 | 0.99 | 1.05 | 0.96 |
| Total Feed (g) | 670 | 346 | 714 | 569 |
| Total Liquid Prod. (g) | 616 | 325 | 640 | 541 |
| Liquid Yield (wt % feed) | 91.9 | 94.0 | 89.7 | 95.0 |
| Water (wt % feed) | 8.8 | 11.2 | 7.2 | 7.5 |
| 0-210° C. (wt % feed) | 2.3 | | 4.9 | 4.7 |
| 210-343° C. (wt % feed) | 77.4 | 74.5 | 70.1 | 69.9 |
| 343° C. + (wt % feed) | 3.4 | 8.2 | 7.5 | 12.8 |
| Gas (wt % feed) | 12.7 | 13.6 | 13.6 | 10.0 |
| Hydrogen Consump. (g/mol/g feed) | 0.0157 | 0.0147 | 0.0140 | 0.0125 |

TABLE 4

Yield Summary

| Experiment | F87-14I | F87-14K | F87-15C |
|---|---|---|---|
| Feedstock | Palm Oil | Soybean | Canola |
| Catalyst | Co-Mo | Co-Mo | Ni-Mo |
| Temperature (°C.) | 360 | 350 | 353 |
| Pressure (MPa) | 5.5 | 5.5 | 5.5 |
| LHSV (actual, hr⁻¹) | 1.18 | 1.03 | 1.00 |
| Total Feed (g) | 792 | 200 | 662 |
| Total Liquid Prod. (g) | 723 | 169 | 610 |
| Liquid Yield (wt % feed) | 91.3 | 84.4 | 92.2 |
| Water (wt % feed) | 8.7 | 2.0 | 7.6 |
| 0-210° C. (wt % feed) | 2.0 | 3.7 | 2.6 |
| 210-343° C. (wt % feed) | 71.1 | 44.4 | 81.1 |
| 343° C. + (wt % feed) | 9.5 | 34.3 | 0.9 |
| Gas (wt % feed) | 11.3 | 11.0 | 13.9 |
| Hydrogen Consump. (g/mol/g feed) | 0.0128 | 0.0087 | 0.0131 |

The results, including hydrogen consumption, are illustrated in Table 2.

The canola oil used in the Table 2 experiments was high grade oil. A series of experiments was also conducted to determine the conditions for hydroprocessing low-grade canola oil, the fatty acid fraction of crude tall oil and other vegetable oils. The yields are summarized in Tables 3 and 4. The Ni-Mo catalyst was tested in one of the experiments.

Gas analyses were performed for all the experiments. The results are given in the Tables 5, 6 and 7.

TABLE 5

Gas Analyses

| Components (vol %) | F86-09B | F86-09C | F86-09D1 | F86-09D2 | F86-10B | F86-10C | F86-10D | F86-10E | F86-10F | F86-10G |
|---|---|---|---|---|---|---|---|---|---|---|
| $C_5+$ | 0.4 | 0.14 | 0.95 | 0.67 | 0.02 | 0.06 | 0.19 | 0.35 | 1.04 | 0.26 |
| $H_2$ | 87.88 | 79.56 | 87.51 | 90.32 | 90.52 | 90.92 | 97.08 | 92.52 | 93.72 | 96.17 |
| $C_3H_8$ | 5.66 | 9.22 | 4.51 | 3.53 | 4.21 | 2.49 | 1.68 | 3.47 | 1.81 | 0.98 |
| $C_3H_6$ | | | | 0.15 | 0.05 | 0.68 | 0.15 | 0.01 | 0.02 | 0.35 |
| $n-C_4H_{10}$ | 0.04 | 0.32 | 0.33 | 0.26 | 0.02 | 0.01 | 0.01 | 0.11 | 0.31 | 0.10 |
| $CO_2$ | 3.10 | 3.74 | 3.75 | 2.39 | 2.28 | 1.03 | 0.23 | 1.81 | 1.63 | 1.02 |
| $C_2H_6$ | 0.59 | 1.60 | 1.01 | 0.94 | 0.83 | 0.19 | 0.11 | 0.48 | 0.38 | 0.22 |
| $N_2$ | 0.54 | 0.47 | 0.13 | 0.36 | 0.45 | 2.85 | 0.08 | 0.06 | 0.12 | 0.10 |
| $CH_4$ | 1.84 | 4.50 | 0.73 | 0.50 | 0.02 | 0.10 | 0.46 | 0.48 | 0.28 | 0.09 |
| CO | 0.32 | 0.45 | 1.05 | 0.88 | 1.60 | 1.67 | | 0.71 | 0.69 | 0.64 |

TABLE 5-continued

| Components (vol %) | F86-09B | F86-09C | F86-09D1 | F86-09D2 | F86-10B | F86-10C | F86-10D | F86-10E | F86-10F | F86-10G |
|---|---|---|---|---|---|---|---|---|---|---|
| TOTAL | 100.00 | 100.00 | 100.00 | 100.00 | 100.00 | 100.00 | 100.00 | 100.00 | 100.00 | 100.00 |

Results and Discussion

Canola Oil (High Grade)

Experiments conducted at various temperatures led to the conclusion that 350° C. was the lower limit for trouble-free operation. The data indicated that slightly higher temperatures had minimal effect on yields. The GC-MS analysis indicated that the 210°–343° C. fraction contained approximately 95% straight chain alkanes with a 15 to 18 carbon atoms composition. The Co-Mo catalyst was used unless indicated otherwise. The catalyst was presulphided with a conventional petroleum gas oil spiked with 2.5 wt. percent carbon disulphide ($CS_2$). The catalyst was deactivated steadily during the course of experiments, as evidenced by the propane content of the gas product and the water content of the liquid product.

TABLE 6

Gas Analyses

| Components (vol. %) | F87-11B | F87-11C | F87-11D | F87-11E | F87-11F | F87-11G | F87-12B | F87-12C |
|---|---|---|---|---|---|---|---|---|
| $C_5+$ | 0.03 | 0.03 | 0.06 | 0.10 | 0.04 | 0.08 | 0.16 | 0.16 |
| $H_2$ | 92.93 | 93.70 | 96.70 | 98.77 | 94.55 | 95.16 | 95.02 | 94.90 |
| $C_3H_8$ | 3.84 | 4.21 | 1.48 | 0.12 | 3.00 | 2.38 | 2.51 | 2.24 |
| $C_3H_6$ | 0.04 | | | | 0.01 | 0.17 | | 0.34 |
| $n\text{-}C_4H_{10}$ | 0.03 | 0.03 | 0.01 | | 0.02 | 0.02 | 0.05 | 0.03 |
| $CO_2$ | 1.16 | 1.00 | 0.73 | 0.04 | 1.33 | 0.66 | 0.78 | 0.51 |
| $C_2H_6$ | 0.17 | 0.27 | 0.11 | 0.03 | 0.24 | 0.27 | 0.35 | 0.28 |
| $N_2$ | 0.95 | 0.13 | 0.08 | 0.06 | 0.07 | 0.49 | 0.44 | 0.92 |
| $CH_4$ | 0.42 | 0.47 | 0.17 | 0.05 | 0.26 | 0.22 | 0.40 | 0.18 |
| CO | 0.40 | 0.17 | 0.43 | 0.04 | 0.48 | 0.55 | 0.30 | 0.44 |
| $H_2S$ | | | 0.24 | 0.81 | | | | |
| TOTAL | 100.00 | 100.00 | 100.00 | 100.00 | 100.00 | 100.00 | 100.00 | 100.00 |

TABLE 7

Gas Analyses

| Components (vol. %) | F87-14I | F87-14K | F87-15C |
|---|---|---|---|
| $C_5+$ | 0.023 | 0.022 | 0.020 |
| $H_2$ | 92.683 | 96.270 | 93.292 |
| $C_3H_8$ | 3.182 | 1.819 | 3.238 |
| $C_3H_6$ | 0.178 | 0.226 | |
| $i\text{-}C_4H_{10}$ | 0.007 | | |
| $n\text{-}C_4H_{10}$ | 0.021 | 0.016 | 0.012 |
| $CO_2$ | 1.969 | 0.652 | 2.045 |
| $C_2H_6$ | 0.484 | 0.234 | 0.151 |
| $N_2$ | 0.230 | 0.151 | 0.117 |
| $CH_4$ | 0.428 | 0.215 | 0.677 |
| CO | 0.801 | 0.397 | 0.449 |
| TOTAL | 100.000 | 100.000 | 100.000 |

| Components (vol. %) | F87-14B | F87-14D | F87-14E | F87-14G |
|---|---|---|---|---|
| $C_5+$ | 0.064 | 0.316 | 0.349 | 0.159 |
| $H_2$ | 93.082 | 93.351 | 92.623 | 96.795 |
| $C_3H_8$ | 3.358 | 2.998 | 2.466 | 0.076 |
| $C_3H_6$ | 0.010 | 0.010 | 0.072 | |
| $i\text{-}C_4$ | 0.007 | | | |
| $n\text{-}C_4$ | 0.028 | 0.033 | 0.064 | 0.047 |
| $CO_2$ | 2.173 | 1.838 | 2.690 | 1.539 |
| $C_2H_6$ | 0.203 | 0.337 | 0.450 | 0.073 |
| $N_2$ | 0.170 | 0.029 | 0.209 | 0.269 |
| $CH_4$ | 0.439 | 0.579 | 0.409 | 0.470 |
| CO | 0.488 | 0.510 | 0.669 | 0.571 |
| TOTAL | 100.000 | 100.000 | 100.000 | 100.000 |

NOTE: The water and 0–210° C. cut were not separated before they were discarded. The values should be typical of the other oils, i.e. water will be approximately 7% and 0–210 will be 4%.

known sulphiding compounds other than carbon disulphide, for instance dimethylsulphide, dimethyldisulfi hydrogen sulfide etc. may also be used.

The optimum hydroprocessing temperatures and pressures are shown in Table 8.

Rapeseed Oil

The rapeseed oil produced less 210°–343° C. material because it has a higher concentration of longer fatty acid chain length material which puts much of the converted material into the 343° C.+ fraction. The catalyst was the same as for canola oil, above. The optimum temperatures and pressures are shown in Table 8.

Sunflower Oil

The sunflower oil results are similar to those of canola because the fatty acid chain length of the starting materials are similar. The same catalyst (Co-Mo) was used. The optimum temperatures and pressures are shown in Table 8.

Soybean Oil

The results are similar to those of canola oil because the fatty acid chain length of the starting materials are similar.

TABLE 8

| | Hydroprocessing Temperatures and Pressures | | | | | |
|---|---|---|---|---|---|---|
| | Temperature (°C.) | | | Pressure (Mega Pascals) | | |
| Feedstock | Optimum Temp. | Tolerance | Range | Optimum Pressure | Tolerance | Range |
| Canola Oil | 370 | +10 | 350–450 | 4.8 (minimum) | +9.0 | 4.8–13.8 |

TABLE 8-continued

| Feedstock | Hydroprocessing Temperatures and Pressures | | | | | |
|---|---|---|---|---|---|---|
| | Temperature (°C.) | | | Pressure (Mega Pascals) | | |
| | Optimum Temp. | Tolerance | Range | Optimum Pressure | Tolerance | Range |
| Sunflower Oil | 360 | +10 | 350–450 | 4.8 (minimum) | +9.0 | 4.8–13.8 |
| Soybean Oil | 360 | +10 | 350–450 | 4.8 (minimum) | +9.0 | 4.8–13.8 |
| Rapeseed Oil | 390 | +10 | 380–450 | 8.2 (minimum) | +7.0 | 8.2–15.2 |
| Tall Oil Fatty Acid | 390 | +10 | 380–450 | 4.8 (minimum) | +9.0 | 4.8–13.8 |
| Palm Oil | 370 | +10 | 360–450 | 4.8 (minimum) | +9.0 | 4.8–13.8 |

NOTE: Optimum temperatures and lower limits would increase with increasing space velocity. Temperatures in commercial scale reactors may be as much as 30° C. lower due to hydrodynamics, exothermicity and other factors.

The same Co-Mo catalyst was used. The optimum temperatures and pressures are illustrated in Table 8.

"Sample" Canola Oil

This lower grade of canola oil proved to be more difficult to process than the high-grade canola oil. The optimum temperature was ca. 20° C. higher for the "sample" canola oil than for the high-grade oil (ca. 375° C.). The optimum pressure was in the 4.8–13.8 MPa range.

"Green" Canola Oil

The results were similar to those for "sample" canola oil.

Palm Oil

The results were similar to those for canola oil (high grade), but a high melting point wax material (35°–40° C.) was collected during the distillation of the palm oil product. The temperatures and pressures are shown in Table 8.

Tall Oil Fatty Acid Fraction

This feedstock was processed at somewhat higher temperatures than that utilized for the vegetable oils (Table 8). At temperatures of 350° C. and lower, the product collection system was plugged with a solid margarine-like material.

Other Catalysts

The majority of the research was conducted using the Co-Mo catalyst. The only other catalyst tested was the Shell hydroprocessing catalyst. The results obtained with this catalyst were satisfactory and indicate that other hydroprocessing catalysts may possibly be utilized as well for the hydroprocessing of fatty acids and triglyceride oils.

The following Table 9 shows, for comparison, the quantitative analysis of the hydrocarbon products resulting from the hydroprocessing of a variety of feedstocks, and the fatty acid composition of those feedstocks.

The GC-MS analysis of the hydroprocessed product showed the 0°–210° C. fraction to be comprised principally of straight and branched chain aliphatic hydrocarbons ($C_6$–$C_{18}$) with a greater concentration of short chain length material present in the higher temperature runs.

TABLE 9

Quantitative Analysis of the Hydrocarbon Product Resulting From the Hydrotreating of a Variety of Feedstocks

| Sample | Peak Area Percentage* | | | | | | | | | Original Distillation Yield (%)** |
|---|---|---|---|---|---|---|---|---|---|---|
| | $C_{15}$ | $C_{16}$ | $C_{17}$ | $C_{18}$ | $C_{19}$ | $C_{20}$ | $C_{21}$ | $C_{22}$ | $C_{24}$ | |
| (a) Canola Oil | | | | | | | | | | |
| Premium Quality (210–343° C. cut) | — | 3.10 | 15.79 | 78.28 | — | 1.38 | — | — | — | — |
| Sample Seed Oil (210–343° C. cut) | 0.53 | 3.28 | 20.40 | 74.69 | — | — | — | — | — | 74.5 |
| Green Seed Oil (210–343° C. cut) | 1.88 | 5.14 | 22.98 | 62.28 | 0.65 | 0.87 | 0.22 | 0.21 | — | 70.1 |
| (b) High Erucic Acid Rapeseed Oil | | | | | | | | | | |
| 210–343° C. cut | 1.35 | 8.27 | 6.85 | 34.73 | 1.68 | 8.09 | 3.71 | 19.66 | — | — |
| 343° C.+ cut | — | 0.26 | 0.68 | 10.29 | 0.80 | 8.12 | 7.42 | 60.62 | 2.57 | — |
| (c) Sunflower Oil (210–343° C. cut) | 0.73 | 8.02 | 5.41 | 70.28 | 3.04 | 0.63 | 1.17 | 0.49 | — | — |
| (d) Palm Oil (210–343° C. cut) | 8.62 | 33.53 | 11.88 | 38.75 | 0.31 | 0.22 | 0.23 | — | — | 71.1 |
| (e) Fatty Acid Fraction of Crude Tall Oil (210–343° C. cut) | 0.40 | 1.27 | 18.89 | 64.28 | 0.83 | 1.57 | — | — | — | 69.9 |

| Sample | Fatty Acid Composition of Hydrotreating Feedstocks | | | | | | | |
|---|---|---|---|---|---|---|---|---|
| | $C_{14}$ | $C_{16}$ | $C_{18}$ | $C_{18:1}$ | $C_{18:2}$ | $C_{20\cdot 18:3}$ | $C_{22}$ | $C_{22:1}$ |
| (a) Canola Oil | | | | | | | | |
| Premium Quality | 0.1 | 4.0 | 1.8 | 62.5 | 20.7 | 10.3 | 0.4 | 0.1 |
| Sample Seed Oil | — | 4.6 | 1.8 | 59.2 | 20.2 | 12.4 | 0.4 | 0.6 |
| Green Seed Oil | — | 4.8 | 1.9 | 58.4 | 19.7 | 13.2 | 0.5 | 0.6 |
| (b) High Erucic Acid | 0.1 | 1.8 | 1.0 | 13.4 | 12.8 | 15.0 | 0.3 | 55.0 |

TABLE 9-continued

| | | | | | | | | |
|---|---|---|---|---|---|---|---|---|
| Rapeseed | | | | | | | | |
| (c) Sunflower Oil | — | 7.0 | 3.3 | 14.3 | 75.4 | — | — | — |
| (d) Palm Oil | 1.2 | 46.8 | 3.8 | 37.6 | 10.0 | 0.5 | — | — |
| (e) Fatty Acid Fraction+ of Crude Tall Oil | — | 0.9 | 1.7 | 22.5 | 37.2 | 0.6 | — | — |

*Percentage of Total GCMS Peak Area. The summation of yields of $C_{15}-C_{24}$ accounts for on average 90% of the total peak area.
**Distillation yield of the respective sample expressed an original weight fed to the HT reactor.
+35 additional nonidentifiable peaks totalling 37.1% of the overall fatty acid composition.

GCMS analysis of the 210°–343° C. fraction showed its composition to be $C_{15}-C_{18}$ paraffins, the major product being octadecane.

Comparative tests were conducted, using the catalysts of the invention at temperatures up to about 320° C. The tests resulted in solid or semi-solid products, not suitable as ignition improvers.

Tests were also conducted to evaluate the potential of the diesel boiling range fraction of the hydroprocessed product of the above described feedstocks as a diesel fuel additive/extender. The addition of this product to conventional diesel fuel results in a decrease in fuel consumption, a slight increase in power generation and a significant improvement in both thermal efficiency and cetane rating of the fuel blend. The cetane rating of this product (i.e. the diesel boiling range fraction of the hydroprocessed vegetable oil) was subsequently measured by the National Research Council's Fuels and Lubricants Lab. and found to be about 100 or above. There is also a linear relationship between the concentration of the diesel boiling range fraction of the hydroprocessed product present in the fuel blend and the cetane rating of the fuel blend, i.e. the cetane rating of the blend increases in linear proportion to the increasing concentration of the product in the blend.

The primary technical objective of converting vegetable oils to a conventional fuel extender was achieved in the project. The degree of success was unexpected. The liquid product was almost completely converted to a high quality (high cetane) diesel boiling range material. Although some residual material (>343° C.) was formed, the FCC MAT tests indicated that it would be easy to convert this material to gasoline components. The GC-MS analysis indicated that none of the original triglyceride complex remained in the product.

It should be appreciated that the plant-derived hydrocarbon product of this invention is a complex mixture of $C_{15}-C_{18}$ paraffinic hydrocarbons. It could not be duplicated from petroleum or other sources. The product is uniquely related to the particular hydroprocessing conditions according to the invention.

We claim:

1. A process for producing liquid paraffinic hydrocarbons in the $C_{15}-C_{18}$ range, effective as diesel fuel cetane rating improvers, comprising:

(a) hydroprocessing a feedstock selected from a group consisting of canola oil, sunflower oil, soybean oil, rapeseed oil, palm oil and fatty acid fraction of tall oil by contacting the feedstock with gaseous hydrogen under conditions of temperature and pressure including selected temperatures from about 350° C. to about 450° C. in the presence of a hydroprocessing catalyst, the conditions effective to cause hydrogenation, hydrotreating and hydrocracking of the feedstock to convert the feedstock a mixture of compounds including mainly a diesel fuel boiling range fraction consisting predominately of $C_{15}-C_{18}$ straight-chain paraffins,
    (b) separating the mixture of compounds; and
    (c) removing from the mixture the diesel fuel boiling range fraction.

2. The process of claim 1 wherein the conditions include a temperature in the range from about 350° C. to about 450°, a hydrogen partial pressure in the range from about 4.8 MPa to about 15.2 MPa and a liquid hourly space velocity of 0.5–5.0 $hr^{-1}$.

3. The process of claim 2 wherein the feedstock consists of the fatty acid fraction of tall oil and the temperature is in the range 380°–450° C., and the pressure is in the range 4.8–13.8 MPa.

4. The process of claim 3 wherein the feedstock consists of canola oil, the temperature is in the range 350°–450° C. and the pressure is in the range 4.8–13.8 MPa.

5. The process of claim 2 wherein the feedstock consists of sunflower oil, the temperature is in the range 350°–450° C. and the pressure is in the range 4.8–13.8 MPa.

6. The process of claim 2 wherein the feedstock consists of soybean oil, the temperature is in the range 350°–450° C. and the pressure is in the range 4.8–13.8 MPa.

7. The process of claim 2 wherein the feedstock consists of rapeseed oil, the temperature is in the range 380°–450° C. and the pressure is in the range 8.2–15.2 MPa.

8. The process of claim 2 wherein the feedstock consists of palm oil, the temperature is in the range 360°–450° C. and the pressure is in the range 4.8–13.8 MPa.

* * * * *